(12) United States Patent
Thompson

(10) Patent No.: US 6,973,268 B1
(45) Date of Patent: Dec. 6, 2005

(54) BI-DIRECTIONAL OPTICAL TRANSMISSION USING DUAL CHANNEL BANDS

(75) Inventor: William A Thompson, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 674 days.

(21) Appl. No.: 09/608,406

(22) Filed: Jun. 30, 2000

(51) Int. Cl.[7] .............................................. H04B 10/24
(52) U.S. Cl. ........................... 398/42; 398/41; 398/79; 398/91; 398/82; 398/87; 398/135; 398/138; 398/140; 398/141; 359/337.1; 359/337.4; 359/341; 359/349; 385/24; 385/37
(58) Field of Search .............................. 398/41, 42, 79, 398/82, 87, 135, 138, 140, 141, 91; 359/337.9, 359/349, 337.4, 337.1, 341; 385/24, 37

(56) References Cited

U.S. PATENT DOCUMENTS

| | | | |
|---|---|---|---|
| 4,300,811 A | 11/1981 | Ettenberg et al. | 350/1.1 |
| 4,704,741 A | 11/1987 | Shikada | 455/606 |
| 5,319,483 A * | 6/1994 | Krasinski et al. | 398/41 |
| 5,408,350 A | 4/1995 | Perrier et al. | 359/168 |
| 5,448,390 A | 9/1995 | Tsuchiya et al. | 359/132 |
| 5,452,124 A * | 9/1995 | Baker | 359/341 |
| 5,548,431 A | 8/1996 | Shin et al. | 359/119 |
| 5,933,553 A | 8/1999 | Ziemann | 385/24 |
| 5,943,149 A * | 8/1999 | Cearns et al. | 398/79 |
| 5,963,349 A | 10/1999 | Norte | 359/116 |
| 5,995,259 A * | 11/1999 | Meli et al. | 398/92 |
| 6,041,152 A | 3/2000 | Clark | 385/24 |
| 6,233,077 B1 * | 5/2001 | Alexander et al. | 359/133 |
| 6,281,997 B1 * | 8/2001 | Alexander et al. | 359/130 |
| 6,490,064 B1 * | 12/2002 | Sakamoto et al. | 359/124 |
| 6,549,315 B1 * | 4/2003 | Kakui | 359/134 |
| 6,631,028 B1 * | 10/2003 | Islam | 359/349 |

FOREIGN PATENT DOCUMENTS

| | | | | |
|---|---|---|---|---|
| EP | 0 892 512 | 1/1999 | | H04B 10/24 |
| EP | 1 0009 112 | 6/2000 | | H04B 10/24 |
| WO | WO 98 05134 | 2/1998 | | H04B 10/24 |

OTHER PUBLICATIONS

U.S. Appl. No.: 09/220,178, filed: Dec. 23, 1998, Applicants: Y. Ota, et al., Title: "Low Crosstalk Bi-Directional Module for Wavelength Multiplexed Optical Communications".

* cited by examiner

*Primary Examiner*—Hanh Phan
(74) *Attorney, Agent, or Firm*—Matthew J. Hodulik; James Milton

(57) ABSTRACT

A bi-directional optical transmission system according to the present invention provides transport of x optical channels over n nodes. The system supports two-way transport of the x channels over a single fiber connecting each of the nodes in sequence. The system is advantageous in that only two optical transmission bands are utilized in order to achieve minimal loss in the separation of bands. The use of only two bands permits the utilization of low-loss wide band thin film optical filters to combine and separate the signals at each node. A reflection port of this filter is used to carry oppositely directed signals of the second band from the bi-directional fiber to an optical amplifier for the second band. An alternate arrangement of the optical filters in the two separate bands is chosen to maximize the optical performance of the overall system and significantly reduce insertion losses.

26 Claims, 1 Drawing Sheet

10

BI-DIRECTIONAL OPTICAL TRANSMISSION USING DUAL CHANNEL BANDS

FIELD OF THE INVENTION

The present invention relates generally to optical communications systems and more particularly to optical communications systems providing communications over a single optical fiber.

BACKGROUND OF THE INVENTION

Bi-directional optical communications systems of the prior art which are capable of two-way transmission over a single optical fiber typically employ wavelength division multiplexing to separate and distribute the communications traffic over a number of distinct wavelengths. One prior art method of single fiber bi-directional optical communications employs wavelength interleaving, where wavelengths traveling in a first direction are interleaved with wavelengths traveling in a second direction. For instance, incremental wavelengths designated as $\lambda_1, \lambda_3, \lambda_5$, etc. are set up to travel in the first direction, whereas within the same spectral band, wavelengths $\lambda_2, \lambda_4, \lambda_6$, etc. travel in the second direction.

Another form of bi-directional communication interleaves multiple sub-bands or blocks of related wavelengths. For example, wavelengths $\lambda_{1-4}$ may be set up to travel in a first direction, wavelengths $\lambda_{5-8}$ to travel in a second direction, wavelengths $\lambda_{9-12}$ to travel in the first direction, wavelengths $\lambda_{13-16}$ to travel in the second direction and so on. In each of the above cases, all of the wavelengths that are utilized are found within the same frequency band, for example, the C-band. Each of the methodologies employs multiple filters in each sub-band in order to process the multiple wavelengths. A consequence is that the presence of the multiple filters produces relatively large overall signal losses. A further consequence is that the loss in the multiple filters can be optimized for only one sub-band in each direction. Accordingly, there is a need for a system that provides decreased signal losses over a wider band of wavelengths/frequencies.

SUMMARY OF THE INVENTION

A bi-directional optical transmission system according to the present invention provides transport of x optical channels over n nodes. The system supports two-way transport of the x channels over a single fiber connecting each of the nodes in sequence. The system is advantageous in that only two optical transmission bands are utilized in order to achieve minimal loss in the separation of signals in the two bands. The two directions of optical transmission within the system have a spectral (wavelength/frequency) separation, in addition to directional separation. The use of only two bands permits the utilization of low-loss wide band thin film optical filters to combine and separate the signals at each node. Further processing of the signals takes place in uni-directional components, e.g., multiplexers, demultiplexers and amplifiers, as required. An alternating arrangement of the optical filters in the two separate bands is chosen to maximize the optical performance of the overall system and significantly reduce insertion losses.

In one exemplary embodiment of the present invention, at each intermediate node in the system, a transmission filter for the first band of optical signals is used between the output of an optical amplifier for the first band and the bi-directional fiber. A reflection port of this filter is used to carry oppositely directed signals of the second band from the bi-directional fiber to an optical amplifier for the second band. An optical transmission filter for the second optical band is also used at each intermediate node between the output of an optical amplifier for the second band and the bi-directional fiber. The reflection port of the second band filter is used to carry the input signal of the first band from the bi-directional fibers to the optical amplifier for the first band. End nodes in the system include only an appropriate one of the transmission filters. The alternate arrangement of filters simultaneously provides for optimal signal performance for both directions of transmission at every node in the system while at the same time minimizing insertion losses from filtering components.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Figure 1:
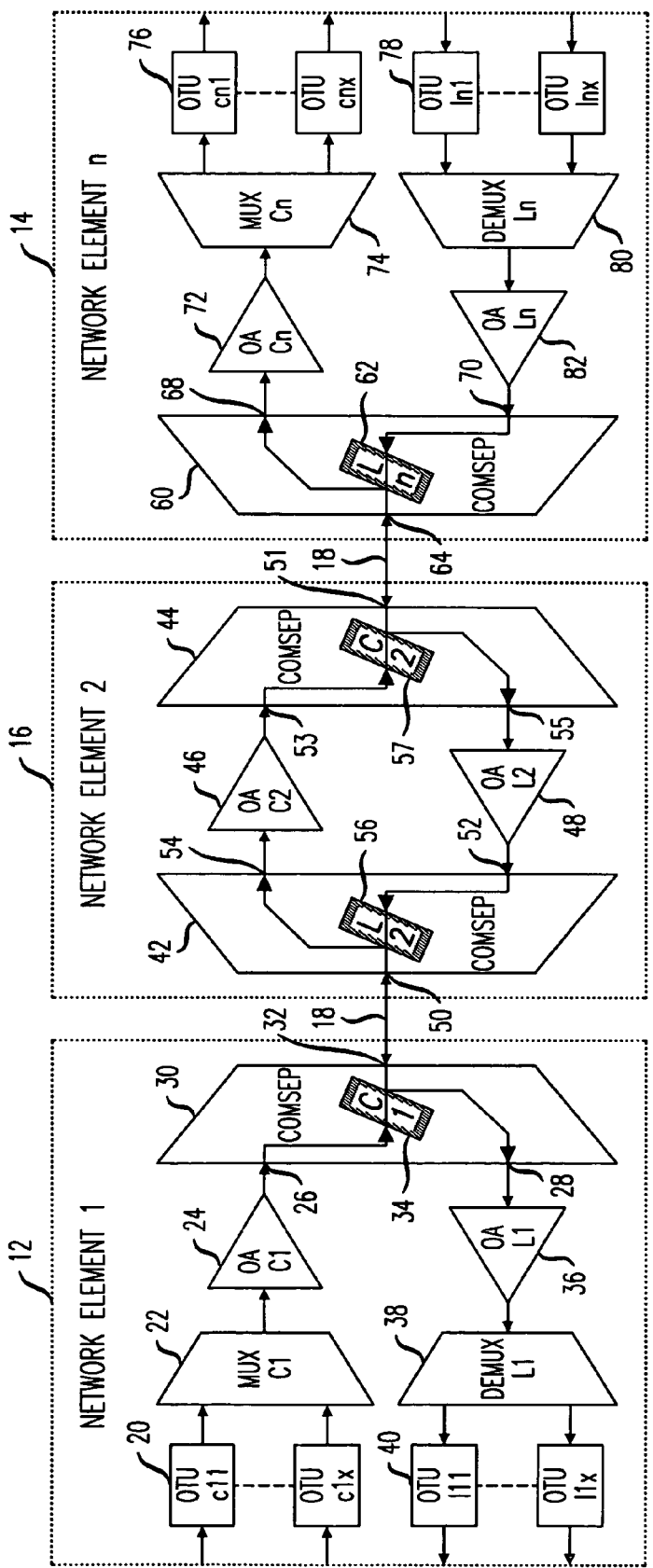
FIG. 1 is an exemplary embodiment of a bi-directional optical transmission system in accordance with the present invention.

Referring to FIG. 1, there is shown one exemplary embodiment of a bi-directional fiber transmission system 10 in accordance with the present invention. The system 10 provides transport of x channels between a first end node 12 and a second end node 14 at different locations. An intermediate node, or a repeater node 16, is shown coupled between the first and second end node 12, 14. It would be understood that any number of intermediate nodes can be coupled in the signal path between the two end nodes in order to maintain appropriate optical transmission levels. Accordingly, a complete bi-directional fiber transmission system includes a total of n nodes. It would also be understood that intermediate nodes may be more than just repeater type nodes and can include pairs of end nodes as well as optical add and drop nodes. In principal, end nodes 12, 14 could be located in the same office and the traffic (structure) connected between them so as to form a complete ring system and not just a simple linear connected chain of nodes. Optical fiber 18 for carrying the bi-directional signals transmitted through the system is coupled between each of the nodes.

The present invention is advantageous in that only two transmission bands, for example, the "C" band in one direction and the "L" band in the other direction, are utilized in order to achieve minimal loss in the separation of signals in the two bands. As is known by those skilled in the art, the C-band generally includes wavelengths in the range of 1530 to 1563 nm and the L-band generally includes wavelengths in the range of 1573 to 1610 nm. The two directions of optical transmission on the fiber 18 between the end nodes 12, 14 have a spectral (wavelength/frequency) separation, in addition to directional separation. The use of only two bands permits the utilization of low-loss wide band thin film optical filters to combine and separate the signals at each node. Further processing of the signals takes place in uni-directional components, e.g., multiplexers, demultiplexers and amplifiers, as required. As shown in FIG. 1, the signals in the C-band propagate from the first end node 12 to the second end node 14, while signals in the L-band propagate from the second end node 14 to the first end node 12.

At the first end node 12, a given number, x, of optical translator units 20 receive incoming signals from the x corresponding wavelength channels. The optical translator units 20 (OTUs) translate the incoming wavelengths (typically 1310 nm) to an appropriate wavelength in the C-band (typically in the range of 1530 nm to 1563 nm). The OTUs 20 are coupled to an optical multiplexer 22 unit which is in turn coupled to an optical amplifier unit 24. These C-band signals are spectrally combined in the optical multiplexer 22 and then amplified via the optical amplifier 24. The output of the optical amplifier 24 couples to an input port 26 of a combiner/separator unit 30 designated in the FIGURE as "COMSEP". As its name implies, the COMSEP 30 combines optical signals traveling in a first direction and separates optical signals traveling in the opposite direction. As shown, the COMSEP includes a single band input port 26, a single band output port 28 and a bi-directional input/output port 32. The single band ports 26, 28 act as inputs and outputs for optical signals of the predefined signal bands traveling in a single direction. In addition, although referred to as single band input and output ports it would be understood that these terms are not meant to be limiting with regard to the specific construction of the ports themselves. That is, the ports are referenced in such a manner so as to provide clarification as to the predominate direction of signal flow throughout the system 10. Internally, the COMSEP unit 30 of the first end node 12 includes a C-band transmission filter 34. A COMSEP containing a C-band transmission filter may be generally referenced as a "C-band COMSEP" in later portions of the document. As will be explained, the C-band filter 34 enables the C-band signals to be transmitted to the bi-directional input/output port 32 of the COMSEP 30 with low insertion loss.

As would be understood, both C-band and L-band signal bands are present at the bi-directional input/output port 32 of the COMSEP 30 and within the fiber 18 connecting between each of the nodes. The C-band signals propagate from the first end node 12 through the intermediate nodes 16 to the second end node 14 on this common fiber 18. At the first end node 12, incoming L-band signals arriving on the bi-directional input/output port 32 are reflected from the C-band filter 34 of the COMSEP 30 and are output through the single band output port 28. The single band output port 28 of the first COMSEP 30 couples to an L-band optical amplifier 36 which in turn couples to an optical demultiplexer (DEMUX) 38. The L-band signals are amplified within the optical amplifier 36 and then spectrally separated in the demultiplexer 38. In converse functionality to the C-band OTUs, L-band optical translator units 40 couple to the outputs of the optical demultiplexer 28 for converting the L-band signals back to a nominal wavelength (typically 1310 nm).

A first repeater node 16 couples to the bi-directional input/output port 32 of the first end node 12. As shown, the repeater node 16 includes two combiner/separator units (COMSEPs) 42, 44 and two optical amplifiers 46, 48 (one each for the L-band and one each for the C-band). As with the COMSEP 30 of the first end node 12, each COMSEP 42, 44 of a repeater node 16 includes a bi-directional input/output port 50, 51 a single band input port 52, 53 and a single band output port 54, 55, respectively. The COMSEP 30 of the first end node 12 which includes the C-band filter 34 couples to a COMSEP 42 in the repeater node 16 that includes an L-band transmissive filter 56. A COMSEP containing an L-band transmission filter may be generally referenced as an "L-band COMSEP" in later portions of the document. As will be discussed, the alternating arrangement of single-band C-band and L-band filters within the COMSEP units of each subsequent node provides advantages with regard to reduction of insertion loss for filters.

As would be understood by those skilled in the art, depending on the distance between the two end nodes, a given number of repeaters may be located between the first end node 12 and the second end node 14. The second end node 14 is essentially a complementary image of the first end node. That is, whereas the COMSEP 30 of the first end node 12 includes a C-band transmission filter 34, the COMSEP 60 of the second end node 14 includes an L-band transmission filter 62. Similarly, the optical amplifiers, multiplexers, demultiplexers and optical translator units are all adapted to the alternate band wavelengths. The second end node 14 couples to the bi-directional fiber 18 through the bi-directional input/output port 64 of the L-band COMSEP 60. The single band output port 68 of the L-band COMSEP 60 in the second end node 14 couples to an optical amplifier 72 which then couples to an optical demultiplexer 74. C-band optical translator units 76 couple to the outputs of the optical demultiplexer 74 for translating the outputs of the optical demultiplexer back to their nominal 1310 nm wavelength.

On the input side of the second end node, optical translator units (OTUs) 78 are included for converting incoming wavelengths to an appropriate wavelength in the L-band. As shown, the OTUs couple to an optical multiplexer 80 and an optical amplifier 82. The optical amplifier 82 couples to the single band input port 70 of the L-band COMSEP 60 of the second end node 14.

Having described the basic structure of the bi-directional transmission system 10, the operation of the present invention can now be described greater detail. Beginning with the first end node 12, incoming wavelengths, e.g., 1310 nm, enter the optical translator units 20 (OTUs) and are translated to an appropriate wavelength in the C-band (e.g., in the range of 1530 nm to 1563 nm). These C-band signals are spectrally combined in the optical multiplexer 22 and then amplified via the optical amplifier 24. The C-band signals are sent to a C-band transmission optical filter 34 at the single band input port 26 in the COMSEP 30. The filter transmits these C-band signals to the bi-directional port with a low insertion loss. With regard to the C-band COMSEP 30, filters are available today with 1.7 dB insertion loss for the worst case under all operating conditions and with 1.3 dB for typical performance at the exemplary target frequencies specified herein. The loss is calculated based on a 1.5 dB transmission loss and an approximate 0.2 dB loss for two connectors. Filters having the above characteristics are available from suppliers such JDS Uniphase of San Jose, Calif. and E-TEK Dynamics, Inc. of San Jose, Calif.

The C-band signals propagate from the first end node 12 to an intermediate node 16 on this common fiber 18. Some portion of the C-band signal may change direction in the common fiber due to a variety of causes including imperfect splices, poor connectors, or even non-linear fiber properties. However, most of these reflected C-band signals that happen to change direction and return to the first end node 12 will be routed by the C-band filter 34 of the COMSEP 30 from the bi-directional port 32 to the single band input port 26. A minimal signal level will be transmitted from the bi-directional port to the output port 28 as determined by the performance of the optical filter used. For example, the suggested filter components will deliver −15 dB or better performance worst case for this parameter. When combined with the worst case spectral performance of the optical amplifier 36 and demultiplexer 38, those skilled in the art would see that no additional spectral filtering is needed for reasonable levels of reflected C-band signals.

At the repeater node 16, the C-band signals from the first end node 12 enter the L-band COMSEP 42 through its bi-directional port 50. This COMSEP 42 has an L-transmission filter 56 and therefore, as shown, the C-band signals reflect off the L-band filter to the output port 54 with minimal insertion loss. L-band filters for this application are available with 0.9 dB for the worst case insertion loss under all operating conditions and with 0.3–0.5 dB typical performance. The loss is calculated based on a 0.7 dB transmission loss and an approximate 0.2 dB loss for two connectors. The C-band signals are amplified in the optical amplifier 46 and then directed to the input port 53 of the C-band COMSEP 44. The C-band signals are propagated from this repeater node 16 to the next node in the system in this manner.

C-band signals exiting the output port of a C-band COMSEP in a last repeater node enter an L-band COMSEP 60 in the second end node 14 through its bi-directional port 64. As shown, the C-band signals reflect off this filter 62 to the output port 68, again with minimal insertion loss. The COMSEP 60 is coupled to an optical amplifier 72, which is in turn coupled to a demultiplexer (DEMUX Cn) 74. The C-band signals are amplified in the optical amplifier 72 and then spectrally separated in the demultiplexer 74. The C-band signals are then spectrally converted back to a nominal wavelength (typically 1310 nm) utilizing the OTU units 76 (cn1 through cnx).

In a similar manner to the C-band signals, nominal wavelength input signals (typically 1310 nm) entering the L-band OTUs 78 in the second end node 14 are translated to appropriate L-band wavelengths (typically in the range of 1573 nm to 1610 nm). The signals are then propagated from the second end node 14 to the first end node 12 in a similar manner to that described with respect to the C-band signals. At the first end node 12 the L-band signals reflect off of the C-band filter 34 in the COMSEP 30. The L-band signals are amplified in the optical amplifier 36 and then spectrally separated in the demultiplexer 38 (DEMUX L1). The L-band signals are then spectrally converted back to a nominal wavelength (typically 1310 nm) utilizing the OTU units 40 (1l1 through 1lx).

The alternating use of C and L transmission filters as described with respect to present invention provides several important advantages to the overall system. The most apparent is that bi-directional transmission on the single fiber between the nodes is realized. This reduces the required fiber to make a two way connection between two network elements by half compared to the current practice in many systems. Understandably, this is a very significant cost saving for customers.

Use of the alternating arrangement of the filters as shown in accordance with the present invention also results in a minimum optical insertion loss at the point of the separation of the low level input signal at each node. This is true for both directions of transmission and is a direct consequence of alternating the filters as described. As can be seen from the FIG. 1, C-band signals traveling from the first end node 12 to the second end node 14 are always separated using a reflection path in an L-band COMSEP. Similarly, L-band signals traveling from the second end node 14 to the first end node 12 are always separated using a reflection path in a C-band COMSEP. Minimizing insertion loss at the point of separation of the bands is critically important because any extra insertion loss at this point is difficult to recover in the system level optical power budgets. This difficulty arises today in real systems because the high power levels that are used for the optical signals launched into the fiber 18 give rise to many corrupting undesirable non-linear effects in the optical fiber between the nodes of the systems. Therefore, the signal launch power levels into fiber 18 are limited and cannot be increased to make up for additional separation loss.

The alternating arrangement of the filters as shown also enables the insertion loss at the launch side filter to be recovered by having a higher power optical amplifier output without incurring non-linear optical power penalties in the outside fiber plant. This is possible because the fiber lengths used between the output of the optical amplifier and the input of the COMSEP are short and, therefore, the optical power penalties due to the higher power until the loss of the COMSEP is encountered are quite negligible.

The system optical power budget is a critical parameter in determining the maximum distance between the optical translator units as it has a direct bearing on the realized system optical signal to noise ratio. In typical systems, a reduction by one half of the noise contribution per span (−3 dB) can be utilized to double the number of spans (+3 dB) before an optical translator unit must be used to regenerate the signal. A system in accordance with the present invention has a 0.8 dB to 4 dB advantage for the optical power budget over the equivalent unidirectional system. This advantage is a function of the specific limitation that a unidirectional system encounters and can be used to either increase the permitted span loss or to increase the maximum number of spans between regeneration of the signals.

The use of only two (2) bands is required to achieve this minimal separation loss. Hence, each band must be wide to support a maximum number of channels. Practical systems today offer channels covering 3–4 THz of spectrum in each band. The selection of wavelengths used here is driven, for example, by available technology for amplification components and by fiber transmission loss characteristics which give minimum fiber loss at about 1565 nm. Hence, the loss in the two bands is approximately equal for the fiber between the nodes of the system. Although the present invention is illustrated for use with wavelengths in the C-band and L-band, it would be understood that the present invention is not so limited and that other bands of wavelengths may also be utilized, for example, more bands may soon be practical between 1300 nm and 1530 nm ("S" band) on fiber in which the water loss peak has been removed. Such bands would have desirable optical dispersion characteristics for channels without having too high a loss characteristic and would be tolerant of higher launch powers compared to present non-zero dispersion shifted fibers. As would be understood, optical characteristics of the single direction optical components would need to be modified accordingly.

Another advantage of the present invention is that the L and C-bands are typically separated by approximately 11 nm of optical bandwidth. The use of these separated wide bands means that stimulated Brillouin scattering (which occurs with a small wavelength offset and counter propagates to the original signal direction) will not cause any penalty. This is due to the directional characteristic of the optical filters in the COMSEP units and is a characteristic not achieved using other means of signal direction such as optical circulators. In this way, the bands are well isolated from one another.

The use of the low loss single band reflection filters shown in the FIGURE is also accompanied by appropriate design of the individual band components, e.g., optical amplifiers, multiplexers and demultiplexers, to assure that any non-ideal leakage of the other band signals do not cause degradation to desired band signals. For instance, selection of the optical amplifiers may include optimized rejection of oppositely directed alternate band signals. In general, however, the individual band components, e.g., optical amplifiers, multiplexers and demultiplexers, selected for use with the present invention are commonly available components, the source of which would be understood to a person skilled in the art.

The present invention is additionally advantageous in that having the signals in the bands travel in opposite directions improves the overall system performance as the interactions of the signals in the two bands is reduced by the fast transit time of one signal with respect to another. This minimizes the system margin that must be allocated for some types of non-linear signal corruption, for example, noise in optical receivers caused by raman coupling between optical signals.

In addition, the total optical power at any connection in the system is reduced compared to equivalent unidirectional propagation by approximately a factor of (2) two. This allows the system to realize higher performance before various hazard levels are crossed. For example, systems that have cross-sectional power levels exceeding 50 mW (approximately +17 dBm) in the 1500–1650 nm range must utilize automatic power shutdown methods to maintain a hazard level 3A rating. As the optical power is increased, the time allowed for shutdown to complete is reduced proportionally. Thus, the present invention permits a shutdown time of nearly double the prior art for the same system total launch power in the two bands. This reduces the required design effort in other sub-systems. In addition, there are physical considerations for fiber where an event (opening a fiber connection for example) triggers a destruction of the fiber ends or can even destroy the fiber all the way back to the amplifier (source of the optical power). Some of these destructive efforts are found at power levels that practical systems employ. Others occur at levels yet to be achieved for commercial systems. The present invention allows operation to just below the threshold for these effects for nearly a factor of two in total system power. This happens because half the power is launched from each end of the fiber and this power is typically attenuated by 3 dB (half) in 10–15 km of fiber. As long as the fiber length between nodes exceeds twice this distance (and it does as systems are usually designed for 80 km node spacing), the peak power level in a cross-section of the fiber will not significantly exceed the power level launched into the fiber from one end alone.

The foregoing description merely illustrates the principles of the invention. It will thus be appreciated that those skilled in the art will be able to devise various arrangements, which, although not explicitly described or shown herein, embody the principles of the invention, and are included within its spirit and scope. For instance, it will be appreciated that the use of the C-band and L-band in the illustration of the invention is merely exemplary and that the use of other bands and sub-bands is contemplated within the scope of the present invention. More specifically, other bands including the C/S bands, and other sub-bands including the C1/C2 sub-bands may also be utilized. Also, although the unidirectional components are represented as single components, it would be understood that more than one component may be utilized to achieve the desired functionality. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A system for bi-directional transmission of optical signals over a single optical medium coupled between at least two nodes, said system utilizing a first optical transmission band for signals traveling in a first direction and a second optical transmission band for signals traveling in a second direction, said system comprising:

at least a first combiner/separator unit at a first of said two nodes, said first combiner/separator including an input port, an output port and a bi-directional input/output port for coupling to said single optical medium, a first optical filter within said first combiner/separator unit coupled to each of said ports therein, said first optical filter being substantially transmissive to optical signals of said first band entering said input port and exiting on said bi-directional input/output port and said first optical filter being substantially reflective for signals of said second band entering said bi-directional input/output port and exiting on said output port; and at least a second combiner/separator unit at a second of said two nodes, said second combiner/separator including an input port, an output port and a bi-directional input/output port coupled to said optical medium, a second optical filter within said second combiner/separator unit coupled to each of said ports therein of said second combiner/separator unit, said second optical filter being substantially transmissive to optical signals of said second band entering said input port and exiting on said bi-directional input/output port and said second optical filter being substantially reflective for signals of said first band entering said bi-directional input output port and exiting on said single direction output port, wherein said first optical filter and said second optical filter are in an alternating arrangement.

2. The system of claim 1, further including at least one intermediate node, said intermediate node comprising:

at least one said first combiner/separator unit and at least one second combiner/separator unit, and at least a first and second optical amplifier, said output port of said first combiner/separator unit coupled to said input port of said second combiner/separator unit through said first optical amplifier, said output port of said second combiner/separator unit coupled to said input port of said first combiner/separator unit through said second optical amplifier;

said first and second combiner/separator units being alternately coupled within said bi-directional transmission system such that pairs of said first and second combiner/separator units are utilized in combination, said bi-directional ports of said combiner/separator units being coupled to one another.

3. The system of claim 1, wherein said optical transmission bands are L-band and C-band.

4. The system of claim 3, wherein said C-band and L-band filters include a transmissive insertion loss in the range of 1.3 to 1.7 dB and reflective insertion loss in the range of 0.3 to 0.9 dB.

5. The system of claim 1, wherein said first node includes a first set of one or more optical translator units for translating received wavelengths to wavelengths of said first transmission band, said optical translator units being coupled to an optical multiplexer unit and said optical multiplexer unit being coupled to said input port of said first combiner/separator unit;

said output port of said first combiner/separator unit coupled to an optical demultiplexer unit, said optical demultiplexer unit coupled to a second set of optical translator units for translating wavelengths of said second transmission band to said received wavelengths.

6. The system of claim 5, wherein said first node further includes at least one optical amplifier coupled between an output of said multiplexer and said input port of said first combiner/separator unit and at least one optical amplifier coupled between said output port of said first combiner/separator unit and an input of said demultiplexer.

7. The system of claim 1, wherein said second node includes a first set of one or more optical translator units for translating received wavelengths to wavelengths of said second transmission band, said optical translator units being coupled to an optical multiplexer unit and said optical multiplexer unit being coupled to said input port of said second combiner/separator unit;

said output port of said second combiner/separator unit coupled to an optical demultiplexer unit, said optical demultiplexer unit coupled to a second set of optical translator units for translating wavelengths of said first transmission band to said received wavelengths.

8. The system of claim 7, wherein said second node further includes at least one optical amplifier coupled between an output of said multiplexer and the input port of said second combiner/separator unit and at least one optical amplifier coupled between said output port of said combiner/separator unit and an input of said demultiplexer.

9. The system of claim 1, wherein said filters included in each of said first and second combiner/separator units are thin film wide-band filters.

10. A system for bi-directional transmission of optical signals over a single optical fiber, said system including at least two nodes having said optical fiber coupled therebetween, said system utilizing only two distinct optical transmission bands, a single one of said bands for transmission of said optical signals in one of two directions, the other of said bands for transmission of said optical signals in the opposite direction, said system comprising:

at least a first and second combiner/separator unit, at least one combiner/separator unit located at each of said two nodes, each said combiner/separator unit including an input port, an output port and a bi-directional input/output port for coupling to said single optical fiber, an optical filter within said combiner/separator units coupled to each of said ports, each said combiner/separator unit operable to direct optical signals entering said input port through said optical filter to said bi-directional input/output port and to reflect optical signals entering said bi-directional input/output port off of said optical filter to said output port;

said optical filter in said first combiner/separator unit being substantially transmissive to a first of said two bands and substantially reflective to optical signals in said second band traveling in an opposite direction;

said optical filter in said second combiner/separator unit being substantially transmissive to signals in said second band and substantially reflective for signals of said first band traveling in an opposite direction; and said first and second combiner/separator units being alternately coupled within said bi-directional transmission system such that pairs of said first and second combiner/separator units are utilized in combination, said bi-directional ports of said combiner/separator units being coupled to one another, wherein said optical filter in said first combiner/separator unit and said optical filter in said second combiner/separator unit are in an alternating arrangement.

11. The system of claim 10, further including at least one intermediate node, said intermediate node comprising:

at least one said first combiner/separator unit and at least one second combiner/separator unit, and at least a first and second optical amplifier, said output port of said first combiner/separator unit coupled to said input port of said second combiner/separator unit through said first optical amplifier, said output port of said second combiner/separator unit coupled to said input port of said first combiner/separator unit through said second optical amplifier.

12. The system of claim 10, wherein an end node in said system includes either a first or second combiner/separator unit, said end node further including a first set of one or more optical translator units for translating received wavelengths to wavelengths of one of said two distinct transmission bands, said optical translator units being coupled to an optical multiplexer unit and said optical multiplexer unit being coupled to said input port of said combiner/separator unit; and said output port of said combiner/separator unit coupled to an optical demultiplexer unit, said optical demultiplexer unit coupled to a second set of optical translator units for translating wavelengths of said other of said two transmission bands to said received wavelengths.

13. The system of claim 12, wherein said end node further includes at least one optical amplifier coupled between an output of said multiplexer and the input port of said combiner/separator unit and at least one optical amplifier coupled between said output port of said combiner/separator unit and an input of said demultiplexer.

14. The system of claim 10, wherein said filters included in each of said first and second combiner/separator units are thin film wide-band filters.

15. The system of claim 10, wherein said transmission bands are selected from the group consisting of L-band/C-band, C-band/S-band, C1 band/C2 band and S-band/L-band.

16. The system of claim 15, wherein said C-band and L-band filters include a transmissive insertion loss in the range of 1.3 to 1.7 dB and reflective insertion loss in the range of 0.3 to 0.9 dB.

17. A method for bi-directional transmission of optical signals over a single optical fiber coupled between two nodes, said method utilizing only two distinct optical transmission bands, a single one of said bands for transmission of said optical signals in one of two directions, the other of said bands for transmission of said optical signals in the opposite direction, said method comprising:

provide at least a first and second combiner/separator unit, at least one combiner/separator unit located at each of said two nodes, said combiner/separator units each including an input port, an output port and a bi-directional input/output port for coupling to said single optical fiber, an optical filter within said combiner/separator units coupled to each of said ports, each of said combiner separator units operable to direct optical signals entering said input port through said optical filter to said bi-directional input/output port and to reflect optical signals entering said bi-directional input/output port off of said optical filter to said output port, said optical filter in said first combiner/separator unit being substantially transmissive to a first of said two bands and substantially reflective to optical signals in said second band traveling in an opposite direction, said optical filter in said second combiner/separator unit being substantially transmissive to signals in said second band and substantially reflective for signals of said first band traveling in an opposite direction; and alternately coupling said first and second combiner/separator units within said bi-directional transmission system such that pairs of said first and second combiner/separator units are utilized in combination, said bi-directional ports of said combiner/separator units being coupled to one another, wherein said optical filter in said first combiner/separator unit and said optical filter in said second combiner/separator unit are in an alternating arrangement.

18. The method of claim 17, wherein said transmission bands are selected from the group consisting of: L-band/C-band, C-band/S-band, C1 band/C2 band and S-band/L-band.

19. Apparatus, comprising:

means for filtering, and means for transmitting a first signal in a first signal band from a first path onto an optical medium via said means for filtering, said means for filtering being substantially transmissive to signals in said first signal band and substantially reflective to signals in a second signal band received from said optical medium onto a path separate from said first path, wherein said means for filtering is adapted to be coupled in an alternating arrangement to a second means for filtering, said second means for filtering being substantially transmissive to said signals in said second signal band and substantially reflective to said signals in said first signal band.

20. The apparatus of claim 19, wherein one of said first and second signals is a C-band signal and the other is an L-band signal.

21. The apparatus of claim 19, wherein the means for transmitting said first signal comprises:

means for modulating, multiplexing, and amplifying a plurality of input signals to form said first signal, and wherein said apparatus further connects to said optical medium.

22. The apparatus of claim 21, further comprising means for amplifying, demultiplexing, and demodulating said second signal.

23. The apparatus of claim 22, wherein the means for filtering comprises:

an input port for receiving said first signal from said first path, a bi-directional input/output port for applying said first signal to said optical medium and for receiving said second signal from said optical medium, and a reflection port for applying said second signal to said separate path.

24. Apparatus for use in a communication system of a type in which optical signals in a first signal band are transported in one direction along an optical transport medium and signals in a second signal band are transported in the opposite direction of said optical transport medium, said apparatus comprising:

a first signal path, a second signal path, different from said first path, and an optical filter that allows the signals traveling in said one direction to flow from said first path onto said transport medium and that reflects the signals traveling in said opposite direction onto said second path, wherein said optical filter is adapted to be coupled in an alternating arrangement to a second optical filter, said second optical filter allows said signals in said second signal band to flow onto said transport medium and reflects said signals in said first signal band.

25. The apparatus of claim 24 wherein:

said first signal path includes means for multiplexing and amplifying a plurality of input signals to form said signals traveling in said one direction, said signals traveling in said opposite direction include a plurality of multiplexed incoming signals, and said second signal path includes means for demultiplexing and amplifying said multiplexed incoming signals.

26. The apparatus of claim 25, wherein one of said signal bands is the C band and the other of said signal bands is the L band.

* * * * *